H. C. HART.
METHOD OF MAKING POLYGONAL NUTS.
APPLICATION FILED JAN. 3, 1916.
1,206,698.
Patented Nov. 28, 1916.
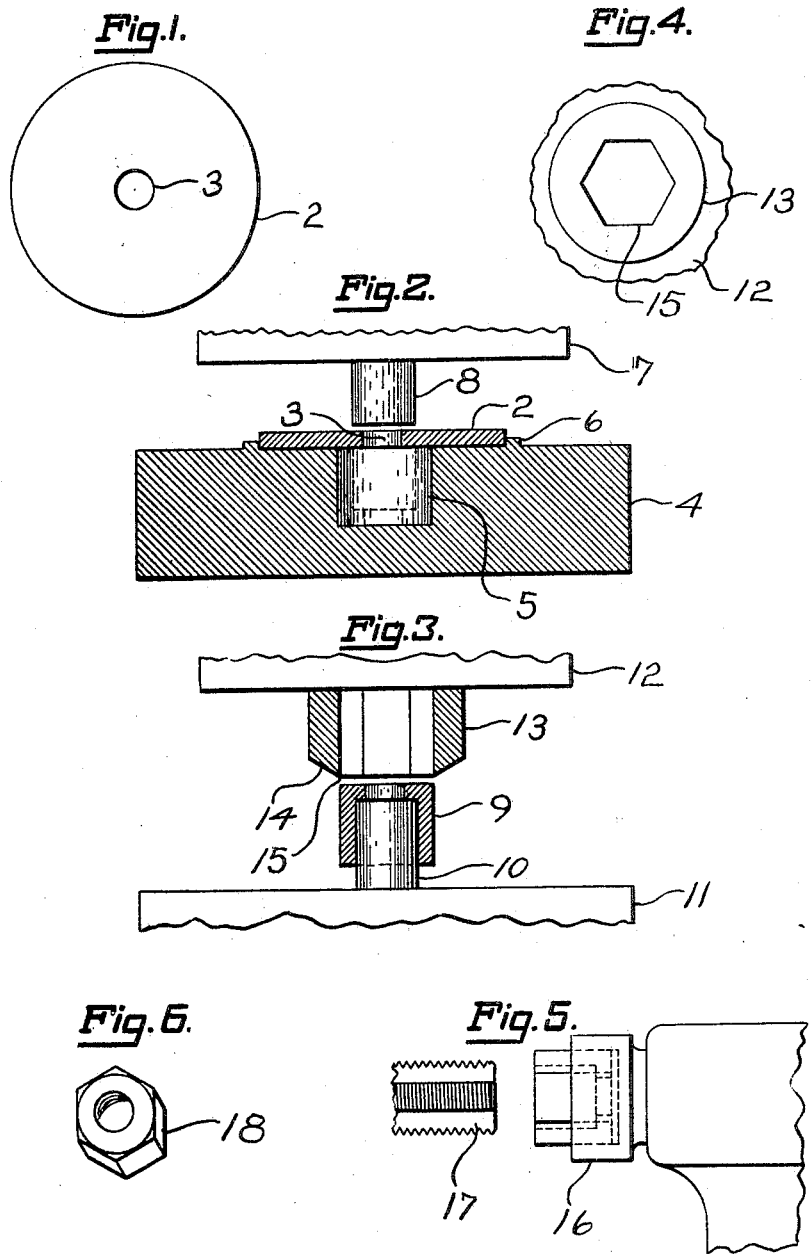

UNITED STATES PATENT OFFICE.

HUBERT C. HART, OF UNIONVILLE, CONNECTICUT.

METHOD OF MAKING POLYGONAL NUTS.

1,206,698.

Specification of Letters Patent. Patented Nov. 28, 1916.

Application filed January 3, 1916. Serial No. 69,766.

*To all whom it may concern:*

Be it known that I, HUBERT C. HART, a citizen of the United States, residing at Unionville, in the county of Hartford and State of Connecticut, have invented certain new and useful Improvements in Methods of Making Polygonal Nuts, of which the following is a specification.

This invention relates to a method of making polygonal nuts. By the method I can produce in an inexpensive, rapid and accurate manner articles of the character set forth.

In the drawings accompanying and forming part of the present specification I have shown certain instrumentalities by which the method can be carried into effect. I may use other means for the desired purpose. I also show an article made by the method.

As may be inferred the invention concerns the manufacture of a polygonal nut. That form of nut which I have shown is hexagonal which, as will be gathered, is one of several types of polygonal nuts susceptible of being made by the present method. I might also state that while the method hereinafter disclosed comprises as to one step thereof the formation of a cup-like part from flat stock and the subsequent cutting of the flat stock to produce the article of the requisite external shape, this may not always be necessary. The elemental consideration is the cutting or shearing of the stock and the method need not necessarily commence with the shaping of a blank from flat form into a cup, for I might buy the cups and inaugurate the method with the cutting action, which is the important consideration. Where, however, the method is a successive one, that is commencing with the flat blank and finishing with the tapped article, obvious advantages follow.

Referring to said drawings: Figure 1 is a top plan view of a blank. Fig. 2 is a sectional side view of a die supporting a blank, and a punch press, the blank being shown in its initial condition by full lines and in its cupped form by dotted lines. Fig. 3 is a practically similar view of a support for the cupped blank and a cutting or shearing member just prior to the time said support and shearing member commence their relative advance movements to effect a cut. Fig. 4 is a bottom plan view of the intermediate portion of the shearing or cutting member. Fig. 5 is a detail view showing a way of tapping out the hexagonal cupped blank. Fig. 6 is a perspective view of the finished article.

Like characters refer to like parts throughout the several views.

As already noted the important consideration is the external shearing or cutting of a cupped part so as to produce an element which is polygonal externally in cross section. As a matter of preference, although not of absolute necessity, I prefer to commence the process with a flat blank such for instance as the disk 2 of sheet metal such as brass. This disk or blank 2 as represented has a central hole 3. The hole may not in all cases be present. In the case of a cap nut or one having one end closed, there will be no hole in the blank. This blank can be easily cut from sheet stock. It is laid on the upper flat surface of the die 4. This die has a cylindrical cavity 5. Around the cylindrical cavity on the upper surface of the die 4 there may be the annular bead or flange 6 concentric with the axis of the said cavity and within which the disk or flat blank 2 may be received as shown in Fig. 2.

The numeral 7 denotes a punch press provided with the cylindrical extension or pendant punch portion 8. The diameter of the cavity 5 is practically equal to the external diameter of the cupped blank hereinafter described, the diameter of the punch portion 8 being virtually equal to the internal diameter of said cupped blank.

On the relative motion of the parts 4 and 7 and with the blank positioned as shown in Fig. 2, the punch 8 will press the blank 2 into the cylindrical cavity 5 so as to form a cupped blank as shown by dotted lines in said Fig. 2. This cupped blank appears in Fig. 3, being denoted by 9. On the relative retraction of the parts 4 and 7 and after the formation of the cupped blank, this cupped blank is taken from the cavity 5, is inverted and is fitted over the projection 10 of the support 11, the diameter of the projection or stud being practically the same as the internal diameter of the cupped blank. The upper end of the projection fits against what is now the top of the cupped blank 9, this top having as will be clear an approximately central hole. The projection or stud 10, it should be noted is longer than the cupped blank, so that the lower edge of said cupped blank will be separated from the upper surface of the body of the support. The consequence of this is that a shearing member hereinafter described, can traverse the full length of the cupped blank, and proper disposition can also be made of the chips.

The shearing member as may be gathered, may be of any desirable character, that illustrated being denoted by 12 and having the pendant shearing portion 13 in the form of a hub. The cross sectional form of the opening in this shearing or cutting portion 13 agrees with the external form of the nut, said opening in the present case being hexagonal, because the particular nut shown is of this shape exteriorly. From this it will be clear that the cross sectional shape of the opening of the shearing portion will depend upon the particular kind of nut to be made. The lower part of the shearing portion 13 is beveled as at 14 to produce a cutting edge 15 at the lower end of the shearing portion 13.

After the cupped blank 9 is positioned on the projection 10 as shown in Fig. 3 the support 11 and shearing member 12 are relatively advanced. This action is obtained in the present case by the downward motion of the shearing member 12 which is shown above the blank in said Fig. 3. As the shearing member 12 moves downward and when the cutting edge 15 comes in contact with the blank, the blank will be externally cut, the cutting continuing until what is shown as the lower edge of the blank is reached, the chips falling into the space below the cutting portion 13. In some cases it may not be necessary to shear the cupped blank for its complete length, but I prefer to do this, as I get thereby a better finished article. After the cupped blank has been externally sheared, it may as shown in Fig. 5 be mounted in a holder 16 and threaded interiorly by the use of a tap as 17 to produce the finished nut 18 illustrated in Fig. 6.

What I claim is:

A method comprising the formation from a blank of a cylindrical tube turned in at one end and open at the other, inverting the tube and supporting the tube by its inturned portion upon a stud with the open end or lower edge of the blank spaced from the support from which said stud extends, then externally shearing the cylindrical body from its upper end to its lower or open end to produce an externally polygonal article and in suitably threading said tubular body interiorly thereof.

In testimony whereof I affix my signature in presence of two witnesses.

HUBERT C. HART.

Witnesses:
L. L. MARKEL,
HEATH SUTHERLAND.